US011933236B2

(12) United States Patent
Ikeda et al.

(10) Patent No.: US 11,933,236 B2
(45) Date of Patent: Mar. 19, 2024

(54) CONTROL DEVICE OF VEHICLE

(71) Applicant: TOYOTA JIDOSHA KABUSHIKI KAISHA, Toyota (JP)

(72) Inventors: Yuto Ikeda, Okazaki (JP); Ryota Sugiyama, Nagoya (JP); Takanobu Gotoh, Obu (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 18/134,294

(22) Filed: Apr. 13, 2023

(65) Prior Publication Data

US 2023/0407801 A1 Dec. 21, 2023

(30) Foreign Application Priority Data

Jun. 15, 2022 (JP) ................................ 2022-096654

(51) Int. Cl.
*F02D 41/00* (2006.01)
*F02D 41/02* (2006.01)

(52) U.S. Cl.
CPC ....... *F02D 41/0087* (2013.01); *F02D 41/024* (2013.01); *F02D 41/027* (2013.01); *F02D 2200/02* (2013.01); *F02D 2250/12* (2013.01)

(58) Field of Classification Search
CPC .. F02D 41/0087; F02D 41/024; F02D 41/027; F02D 2200/02; F02D 2250/12; F02D 13/06
USPC ........................................................ 123/481
See application file for complete search history.

(56) References Cited

U.S. PATENT DOCUMENTS 6,837,042 B2 * 1/2005 Colignon ............ F02D 41/0087 60/297
6,966,287 B1 * 11/2005 Livshiz ............... F01L 13/0005 123/90.15
7,225,782 B2 * 6/2007 Pallett .................... B60K 6/445 123/192.1
8,346,418 B2 * 1/2013 Heisel ................. F02D 41/0087 701/22

(Continued)

FOREIGN PATENT DOCUMENTS

JP 2010236398 A * 10/2010
JP 2021-060027 A 4/2021

*Primary Examiner* — Sizo B Vilakazi
*Assistant Examiner* — Brian R Kirby
(74) *Attorney, Agent, or Firm* — Finnegan, Henderson, Farabow, Garrett & Dunner, LLP

(57) ABSTRACT

The vehicle control device executes: a stop process for stopping fuel supply to two cylinders to be stopped; and a selection process of selecting one cylinder to be a stop instruction for stopping fuel supply from among the cylinders to be stopped. The selection process is a process of selecting a cylinder whose compression top dead center appears earliest among the stop target cylinders. The crank angle interval from when the cylinder to be the stop instruction target is selected until the stop instruction target cylinder is switched to the next cylinder among the stop target cylinders is the stoppable angle interval. The stop instruction for the selected cylinder is received before the fuel injection start time and at the stoppable angle interval. The control device executes a retard process of retarding the fuel injection start timing so that the stoppable angle interval includes the fuel injection start timing.

5 Claims, 6 Drawing Sheets

(56) References Cited

U.S. PATENT DOCUMENTS

| | | | | |
|---|---|---|---|---|
| 8,620,561 | B2 * | 12/2013 | Murakami | F02D 41/0087 123/481 |
| 2003/0041831 | A1 * | 3/2003 | Aoki | B60W 10/06 903/917 |
| 2003/0221417 | A1 * | 12/2003 | Surnilla | F02D 41/083 60/284 |
| 2004/0035113 | A1 * | 2/2004 | Hanada | F02D 41/0087 903/917 |
| 2005/0274359 | A1 * | 12/2005 | Miyashita | F02D 41/042 123/431 |
| 2007/0180817 | A1 * | 8/2007 | Yamashita | F02D 41/12 60/285 |
| 2009/0118977 | A1 * | 5/2009 | Whitney | F02P 5/1504 123/481 |
| 2011/0130902 | A1 * | 6/2011 | Heisel | B60W 20/10 180/65.265 |
| 2011/0239987 | A1 * | 10/2011 | Maehara | F02D 13/02 123/406.47 |
| 2011/0265453 | A1 * | 11/2011 | Uhrich | F01N 13/011 60/276 |
| 2011/0283688 | A1 * | 11/2011 | Yuda | F02D 41/0087 60/300 |
| 2012/0053820 | A1 * | 3/2012 | Nishikiori | F02D 41/0087 701/103 |
| 2013/0061573 | A1 * | 3/2013 | In | F02D 41/029 60/274 |
| 2014/0039781 | A1 * | 2/2014 | Theis | F01N 13/011 701/112 |
| 2017/0107922 | A1 * | 4/2017 | Nakasaka | F02D 37/02 |
| 2021/0107452 | A1 | 4/2021 | Nose et al. | |

* cited by examiner

FIG. 1
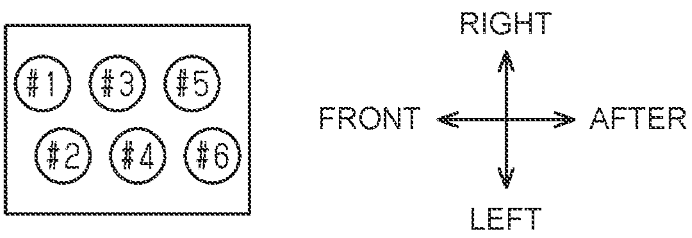
FIG. 2A
COUNTERS CNT OF CYLINDER #1
FIG. 2B
COUNTERS CNT OF CYLINDER #2
FIG. 2C
COUNTERS CNT OF CYLINDER #3
FIG. 2D
COUNTERS CNT OF CYLINDER #4
FIG. 2E
COUNTERS CNT OF CYLINDER #5
FIG. 2F
COUNTERS CNT OF CYLINDER #6
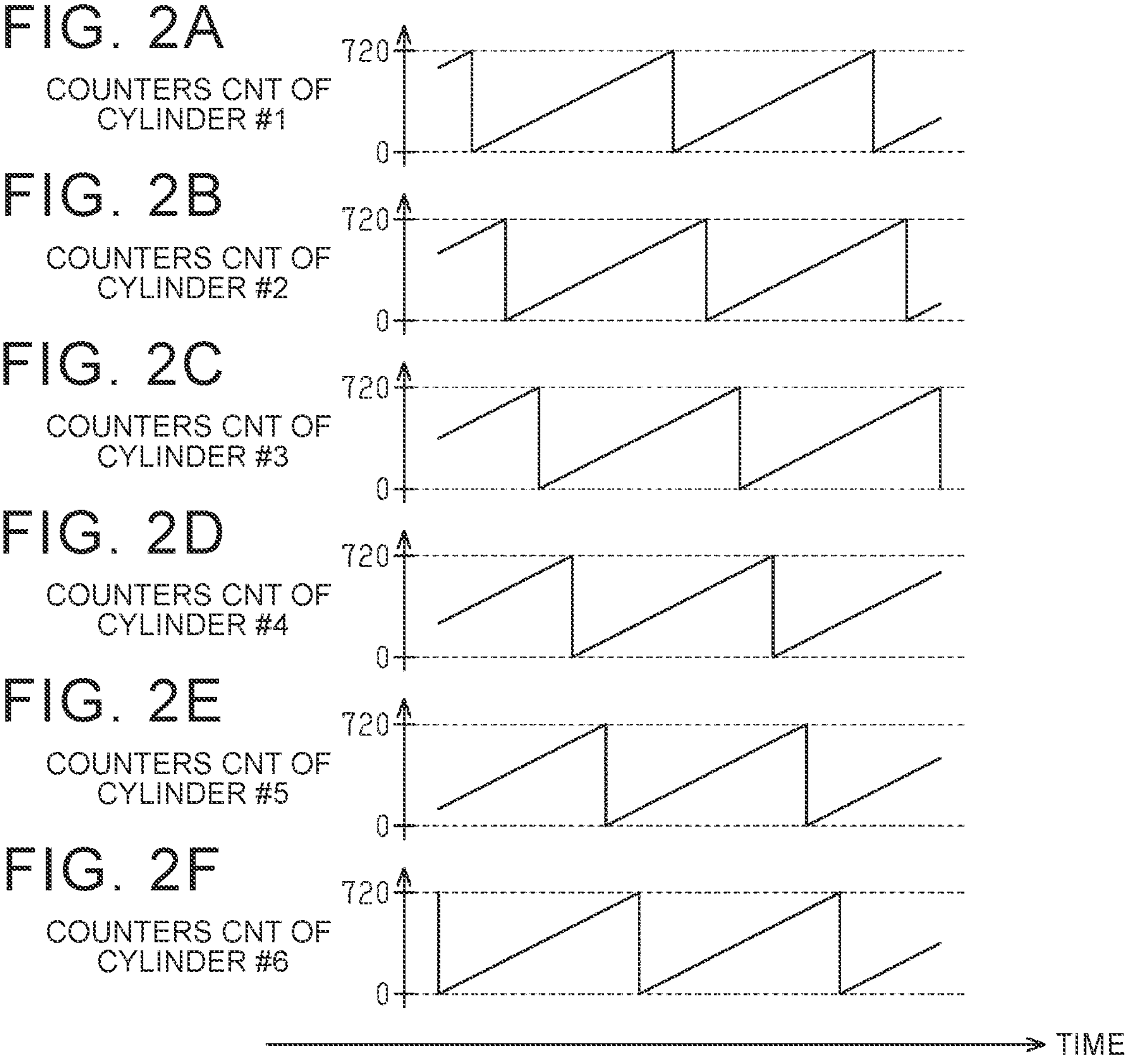

CONTROL DEVICE OF VEHICLE

CROSS-REFERENCE TO RELATED APPLICATION

This application claims priority to Japanese Patent Application No. 2022-096654 filed on Jun. 15, 2022, incorporated herein by reference in its entirety.

BACKGROUND

1. Technical Field

The present disclosure relates to a control device of a vehicle.

2. Description of Related Art

Japanese Unexamined Patent Application Publication No. 2021-060027 (JP 2021-060027 A) discloses a hybrid electric vehicle including: an engine provided with a plurality of cylinders; and a motor generator. The hybrid electric vehicle is provided with an exhaust gas control apparatus for controlling exhaust gas discharged from a plurality of cylinders. A catalyst of the exhaust gas control apparatus exhibits an exhaust gas control capability at an activation temperature. Therefore, in hybrid electric vehicle disclosed in JP 2021-060027 A, when the temperature of the catalyst is low, a catalyst warm-up is performed to warm the catalyst to the activation temperature.

The control device disclosed in JP 2021-060027 A performs a stop process of stopping the supply of fuel to some of the plurality of cylinders of the engine while supplying fuel to the remaining cylinders when catalyst warm-up is required. As a result, oxygen is supplied to the exhaust gas control apparatus through the cylinder in which a fuel supply is stopped. Then, the oxidation reaction in the catalyst is accelerated, and the temperature of the catalyst increases. In this way, the control device can accelerate the catalyst warm-up by executing the oxygen supply by the stop process.

SUMMARY

FIG. 1 shows a V-6 cylinder engine with six cylinders #1 to #6. The six cylinders #1 to #6 are arranged in order from the front. The cylinders #1, #3, and #5 constitute a right bank. The cylinders #2, #4, and #6 constitute a left bank.

FIG. 2 shows a counter CNT of the six cylinders #1 to #6. 0 to 720 degrees of the counter CNT corresponds to a combustion cycle. 0 to 180 degrees of the counter CNT corresponds to an expansion stroke. 180 to 360 degrees of the counter CNT corresponds to an exhaust stroke. 360 to 540 degrees of the counter CNT corresponds to an intake stroke. 540 to 72.0 degrees of the counter CNT corresponds to a compression stroke. 720 degrees of the counter CNT corresponds to a compression top dead center. As shown in FIG. 2, combustion is performed in this order in the six cylinders #1 to #6. An angular interval at which combustion takes place is 120 degrees (=720 degrees divided by 6).

When the above-described stopping process is executed in a V-Type 6-cylinder engine, it is conceivable to stop the supply of fuel to the two opposed cylinders while supplying fuel to the remaining cylinders. An arrival timing of the compression top dead center in one of the facing cylinders is separated by 360 degrees at a crank angle from an arrival timing of the compression top dead center in the other of the facing cylinders. The two facing cylinders are, for example, the cylinder #2 and the cylinder #5. As described above, combustion is performed in the six cylinders #1 to #6 in this order. For this reason, stopping the supply of fuel to the two facing cylinders means stopping the combustion at equal intervals as viewed in the entire engine. Therefore, it is possible to suppress fluctuations in the output from the engine as compared with a configuration in which the combustion is stopped at unequal intervals.

A case where the control device of the engine tries to stop a fuel supply to the cylinders #2 and #5 will be described. The configuration may be such that whether the fuel supply to the cylinder #2 is to be stopped immediately before the compression top dead center appears in the cylinder #2. Thus, even when a request for stopping the supply of fuel to the cylinder #2 occurs slightly before the time at which the compression top dead center appears in the cylinder #2, the request can be immediately responded to. Similarly, whether to stop the fuel supply to the cylinder #5 may be performed immediately before the compression top dead center appears in the cylinder #5.

The control device can only issue an instruction to stop the supply of the fuel to the cylinder #2 and the cylinder #5 in which the compression top dead center appears first as viewed from the present time. In FIG. 3, from the time T11 to the time T12 and from the time T13 to the time T14, the control device can only issue an instruction for stopping the supply of the fuel to the cylinder #5. From the time T12 to the time T13 and from the time T14 to the time T15, the control device can only issue an instruction for stopping the supply of the fuel to the cylinder #2. As a result, it is possible to suppress the calculation load as compared with a configuration in which the control device can perform an instruction for stopping the supply of the fuel to the cylinder #2 and an instruction for stopping the supply of the fuel to the cylinder #5 in parallel.

Here, it is assumed that the stopping process is to be started from a situation in which the port injection is performed at a crank angle 540 degrees before the crank angle corresponding to the compression top dead center in each of the cylinders #1 to #6. The port injection may be performed through a port injection valve provided in an intake passage connected to the cylinders #1 to #6. In FIG. 3, a downward arrow indicates a fuel injection start timing in the port injection.

When the control device of the engine tries to stop the fuel supply to the cylinders #2 and #5, the stop process cannot be executed as described below. As described above, from the time T12 to the time T13, the control device can only issue an instruction to stop supplying fuel to the cylinder #2. However, for the amount supplied to the cylinder #2 when the compressed top dead center appears at the time T13, port-injection is being performed between the time T11 and the time T12. That is, since the supply of the fuel to the cylinder #2 has been already performed, even when an instruction to stop the supply of the fuel to the cylinder #2 is given in a period from the time T12 to the time T13, the supply of the fuel to the cylinder #2 cannot be stopped. As described above, from the time T13 to the time 114, the control device can only issue an instruction to stop supplying fuel to the cylinder #5. However, for the amount supplied to the cylinder #5 when the compressed top dead center appears at the time T14, port-injection is being performed between the time T12 and the time T13. Therefore, the supply of fuel to the cylinder #5 cannot be stopped in the same manner.

As described above, in the case where the fuel injection start time arrives before the period in which the instruction to stop the supply of the fuel can be given during the combustion cycle, the fuel supply cannot be stopped.

Hereinafter, means for solving the above problem and its operations and effects will be described.

According to an aspect of the present disclosure, provided is a control device of a vehicle provided with an internal combustion engine including a plurality of cylinders, the control device including a processing circuit, in which the processing circuit:

is configured to execute a stopping process of stopping a fuel supply to two or more cylinders of the plurality of cylinders and supplying fuel to a remaining one or more cylinders;

is configured such that each of the plurality of cylinders repeatedly execute a combustion cycle such that a compression top dead center of the plurality of cylinders sequentially appear, an operation from a start of an expansion stroke to an end of a compression stroke being the combustion cycle;

is configured to execute a selection process before the stop process, one cylinder that is a target of a stop instruction for stopping the fuel supply among stop target cylinders being selected in the selection process, every time the compression top dead center appears in any stop target cylinder in which the fuel supply is stopped;

the selection process is a process of selecting a cylinder in which a compression top dead center appears earliest among the stop target cylinders at the time of execution of the selection process, a crank angle interval from when the cylinder to be subjected to the stop instruction is selected to when the cylinder to be subjected to the stop instruction is switched to the next cylinder among the stop target cylinders is a stoppable angle interval, and the stop instruction for the selected cylinder is received during the combustion cycle and before a fuel injection start timing and during the stoppable angle interval; and the processing circuit executes a lag process in which the fuel injection start timing lags such that the stoppable angle interval includes the fuel injection start timing.

During the combustion cycle, when the fuel injection start tinting is before the stoppable angular interval, no stop instruction is accepted. According to the above configuration, the processing circuit executes the lag process for making the fuel injection start timing lag so that the fuel injection start timing is included in the stoppable angle interval. Therefore, in the stoppable angular interval, there is a section before the fuel injection start timing. A stop instruction is received in the section. When the stop instruction is received in the section, the fuel supply can be stopped in the section. That is, during the combustion cycle, the fuel supply can be stopped by performing the lag process, in a configuration in which the fuel supply cannot be stopped due to the arrival of the fuel injection start timing before the stoppable angle interval.

The internal combustion engine may include a plurality of intake ports connected to each of the plurality of cylinders, a plurality of port injection valves provided in each of the plurality of intake ports, and a plurality of in-cylinder injection valves provided in each of the plurality of cylinders, in which each of the plurality of port injection valves may be configured to execute a port injection of injecting fuel into a corresponding intake port of the plurality of intake ports, and in which each of the plurality of in-cylinder injection valves may be configured to execute an in-cylinder injection of injecting fuel into a corresponding cylinder of the plurality of cylinders, and wherein the processing circuit may be configured to execute the lag process by changing a fuel injection mode in the stop target cylinder from a port injection mode to an in-cylinder injection mode.

The port injection must be performed before the start of the compression stroke. In contrast, the in-cylinder injection can be performed after the start of the compression stroke. According to the above configuration, the processing circuit executes the lag process by changing the fuel injection mode from the port injection mode to the in-cylinder injection mode. Therefore, the injection start timing of the port injection can be significantly lagged as compared with the configuration in which the injection start timing of the port injection is maintained and made to lag in the port injection mode. Therefore, the section in which the stop instruction is accepted can be increased.

The internal combustion engine may include a plurality of intake ports connected to each of the plurality of cylinders, and a plurality of port injection valves provided in each of the plurality of intake ports, each of the plurality of port injection valves may be configured to execute a port injection of injecting fuel into a corresponding intake port of the plurality of intake ports, and the processing circuit may be configured to execute the lag process by making an injection start timing of the port injection in the stop target cylinder lag.

In a configuration in which the internal combustion engine includes the port injection valve but does not include the in-cylinder injection valve, the section in which the stop instruction is received can be generated. In a configuration in which the internal combustion engine includes the port injection valve and the in-cylinder injection valve, it is possible to generate the section in which a stop instruction is accepted even when the port injection mode is maintained.

The vehicle may include a motor generator, the processing circuit may be configured to control the internal combustion engine and the motor generator such that the internal combustion engine and the motor generator cooperate to generate an output torque required for the vehicle, and the processing circuit may be configured to execute together with the stop process, a compensation process for compensating, through the motor generator, a decrease in an output torque of the internal combustion engine caused by the stop process.

According to the above configuration, the motor generator compensates for a decrease in the output torque of the internal combustion engine caused by the stopping process. Therefore, fluctuations in the output torque of the vehicle can be suppressed. The number of the plurality of cylinders may be six, the stop process may be a process of stopping the fuel supply to the stop target cylinder that is two cylinders of the plurality of cylinders, and supplying fuel to the remaining four cylinders, an arrival timing of the compression top dead center in one of the stop target cylinders may be separated by 360 degrees of a crank angle from an arrival timing of an compression top dead center in another one of the stop target cylinders, the selection process may be a process of alternately selecting one cylinder to be a target for a stop instruction for stopping the fuel supply among the stop target cylinders, every 360 degrees of the crank angle, and the lag process may be a process of making the fuel injection start timing lag such that the fuel injection start timing is included in the stoppable angle interval from a timing 360 degrees in the crank angle before the arrival timing of the compression top dead center to the arrival timing of the compression top dead center.

According to the above configuration, the fuel supply to the two facing cylinders can be stopped by performing the lag angle process in the internal combustion engine having six cylinders.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 1 shows an internal combustion engine with six cylinders;

FIG. 2A is a time chart illustrating the burning performed in the six cylinders of FIG. 1, showing the transition of counters from cylinder #1;

FIG. 2 is a schematic diagram illustrating 2B of the six cylinders of FIG. 1.

FIG. 3 is a schematic diagram illustrating 2C of the six cylinders of FIG. 1;

FIG. 2E is a time chart illustrating the burning performed in the 6 cylinders of FIG. 1, showing the transition of the counters of the cylinder #5;

FIG. 2F is a time chart illustrating the burning performed in the 6 cylinders of FIG. 1, showing the transition of the counters of the cylinder #6;

FIG. 4 is a schematic diagram illustrating a configuration of a vehicle;

DETAILED DESCRIPTION OF EMBODIMENTS

Configuration of the Vehicle

Hereinafter, a vehicle control device according to an embodiment will be described with reference to the drawings.

Figures 3A, 3B:
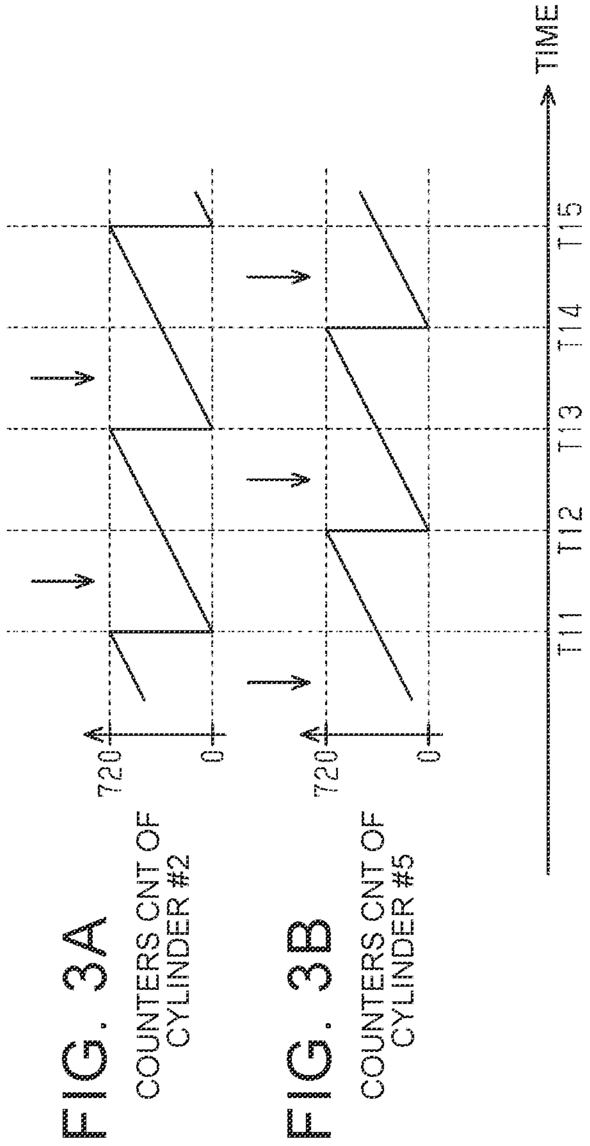
FIG. 3A is a time chart illustrating the burning performed in cylinder #2 of FIG. 1, showing the transition of the counters of cylinder #2.
FIG. 3B is a time chart illustrating the burning performed in cylinder #5 of FIG. 1, showing the transition of the counters of cylinder #5.
Figure 4:
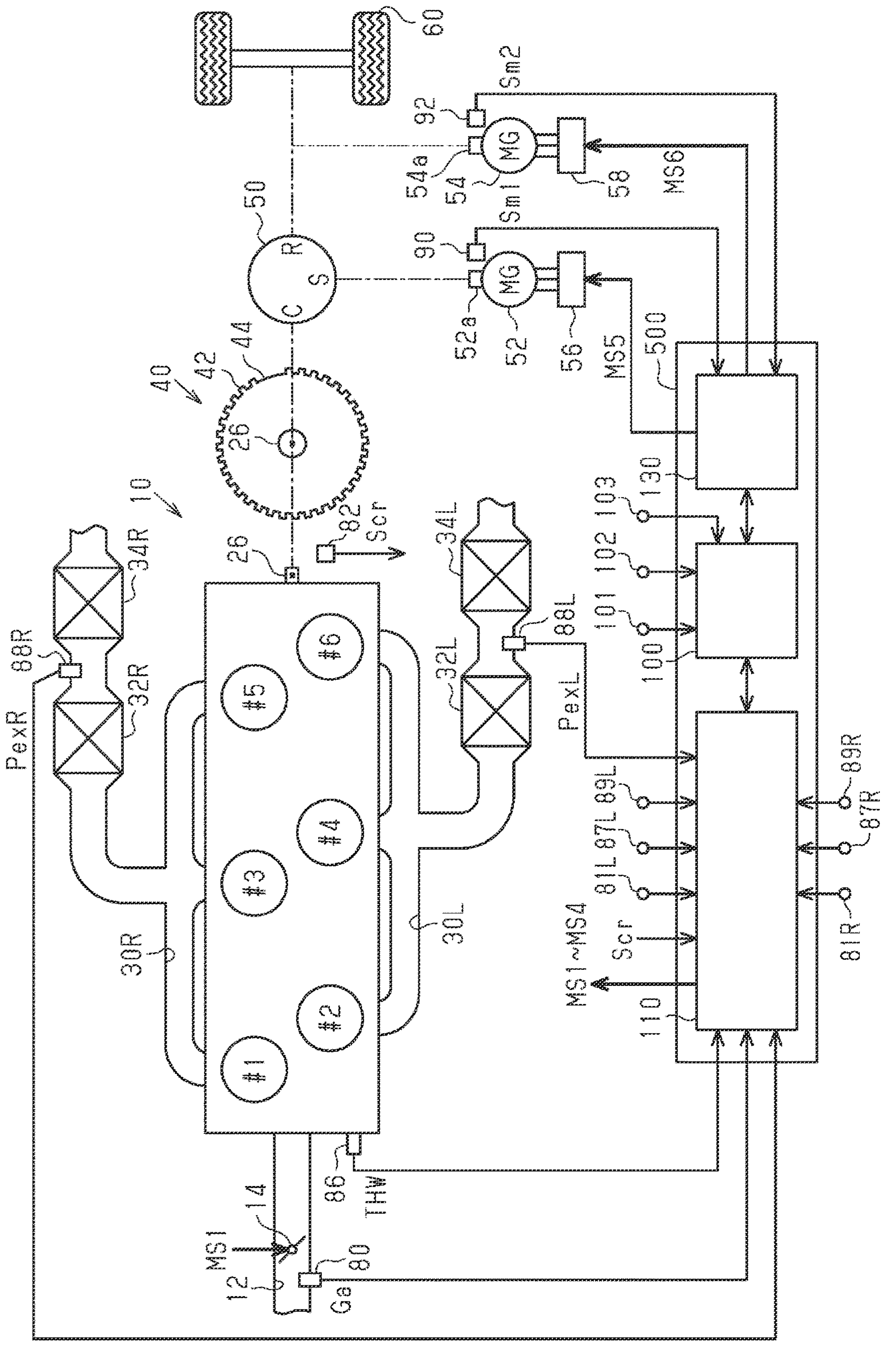
FIG. 4 is a schematic diagram illustrating 2D of the six cylinders of FIG. 1.
Figure 5:
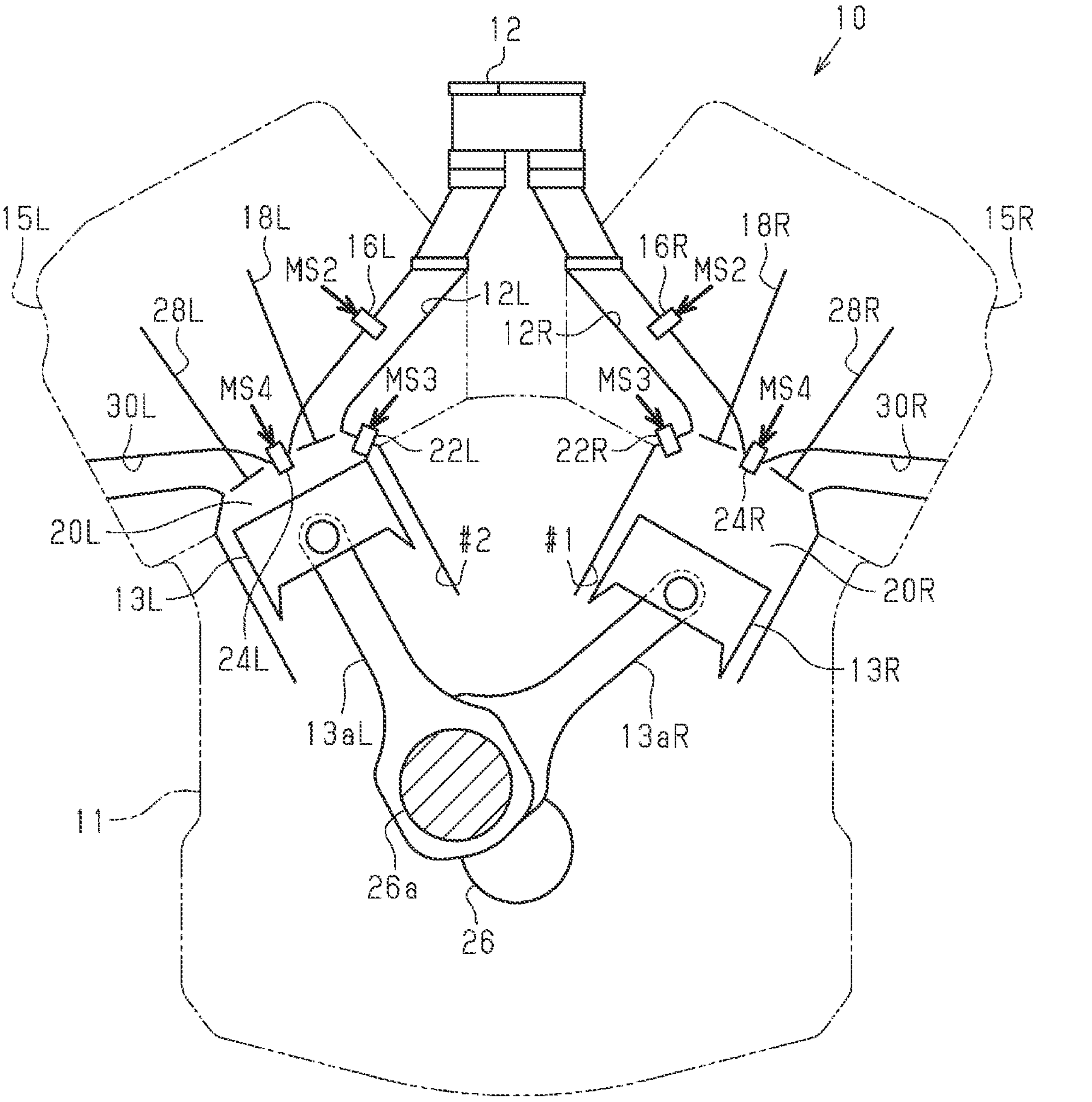
FIG. 5 is a diagram illustrating an internal combustion engine included in the vehicle of FIG. 4.

As shown in FIG. 4, an internal combustion engine (hereinafter referred to as an engine) 10 includes six cylinders #1 to #6. Cylinders #1, #3, and #5 constitute the right bank. Cylinders #2, #4, and #6 constitute a left bank. Hereinafter, the end of the reference numeral of the member corresponding to the right bank will be described as R. The end of the reference numeral of the member corresponding to the left bank will be described as L. As shown in FIG. 5, the engine 10 includes a cylinder block 11 and a cylinder head 15R, 15L. Various components are arranged in the cylinder block 11 and the cylinder head 15R, 15L. FIG. 5 shows a cylinder #1 that is one of the three cylinders #1, #3, and #5 constituting the right bank, and a cylinder #2 that is one of the three cylinders #2, #4, and #6 constituting the left bank. As shown in FIG. 4, a throttle valve 14 is provided in the intake passage 12 of the engine 10. As shown in FIG. 5, a port injection valve 16R, 16L for injecting fuel into the intake port 12R, 12L is provided in the intake port 12R, 121, which is a downstream part of the intake passage 12. Specifically, the engine 10 includes a plurality of port injection valves 16R respectively provided in a plurality of intake ports 12R connected to the plurality of cylinders #1, #3, and #5. The engine 10 includes a plurality of port injection valves 16L respectively provided in a plurality of intake ports 12L connected to the plurality of cylinders #2, #4, and #6. Each of the plurality of port injection valve 16R, 16L performs a port injection that injects fuel into a corresponding one of the plurality of intake port 12R, 12L. The air sucked into the intake passage 12 and the fuel injected from the port injection valve 16R flow into the combustion chamber 20R as the intake valve 18R opens. The air sucked into the intake passage 12 and the fuel injected from the port injection valve 16L flow into the combustion chamber 201, as the intake valve 18L opens. The engine 10 includes a plurality of in-cylinder injection valves 22R provided in each of the plurality of cylinders #1, #3, and #5. The engine 10 includes a plurality of in-cylinder injection valves 22L provided in each of the plurality of cylinders #2, #4, and #6. Each of the plurality of in-cylinder injection valves 22R, 22L performs in-cylinder injection for injecting fuel into a corresponding one of the plurality of cylinders #1 to #6. That is, fuel is injected into the combustion chamber 20R, from the in-cylinder injection valve 22R, 22L. In addition, the air-fuel mixture in the combustion chamber 20R, 20L is subjected to combustion in accordance with spark discharging of the spark plug 24R, 24L.

The combustion energy generated when the mixture is combusted is converted to the rotational energy of the crankshaft 26 as described below. The piston 13R can reciprocate inside each of the cylinders #1, #3, and #5. The piston 13R is connected to the crank pin 26*a* of the crankshaft 26 via a connecting rod 13*a*R. The piston 132 can reciprocate inside each of the cylinders #2, #4, and #6. The piston 13L is connected to the crank pin 26*a* of the crankshaft 26 via a connecting rod 13*a*L. The reciprocating motion of the piston 131, 13R causes the crankshaft. 26 to rotate.

The air-fuel mixture subjected to combustion in the combustion chamber 20R is discharged as exhaust gas to the exhaust passage 30R as the exhaust valve 28R opens. The air-fuel mixture subjected to combustion in the combustion chamber 20L is discharged as exhaust gas to the exhaust passage 30L as the exhaust valve 28L opens. As shown in FIG. 4, the exhaust passage 30R is provided with a three-way catalytic 32R having an oxygen-storage capacity and a gasoline particulate filter (GPF 34R) as an exhaust gas control apparatus. The exhaust passage 30L is provided with a three-way catalytic 321, having an oxygen-storage capacity and a gasoline particulate filter (GPF 34L) as an exhaust gas control apparatus. GPF 34R, 341, is a three-way catalytic converter supported on filters that collect PM.

A crank rotor 40 provided with a tooth portion 42 is coupled to the crankshaft 26. Basically, the crank rotor 40 is provided with 32 teeth 42 every 10 degrees. Therefore, the crank rotor 40 is provided with one missing tooth portion 44 in which two tooth portions 42 are insufficient and the distance between adjacent tooth portions 42 is increased. This is to indicate a reference rotation angle of the crank-shaft 26.

The crank shaft 26 is mechanically connected to a carrier C of a planetary gear mechanism 50 constituting a power splitting device. A rotation shaft 52*a* of a first motor generator 52 is mechanically connected to a sun gear S of the planetary gear mechanism 50. A rotation shaft 54*a* of a second motor generator 54 and drive wheels 60 are mechanically connected to a ring gear R of the planetary gear mechanism 50. An alternating current (AC) voltage is applied to a terminal of the first motor generator 52 by an inverter 56. Further, an AC voltage is applied to a terminal of the second motor generator 54 by an inverter 58. Control device 500

The control device 500 controls the engine 10, the first motor generator 52, and the second motor generator 54. The control device 500 includes an engine control unit 110 that controls the engine 10. The control device 500 includes a motor control unit 130 that controls the first motor generator 52 and the second motor generator 54. The control device 500 further includes an overall control unit 100 that is connected to the engine control unit 110 and the motor control unit 130 to control the vehicle. These control units include a so-called microcomputer having a CPU, ROM, RAM, an input/output interface, and the like. The control units perform signal-processing in accordance with a program stored in advance in ROM while using a temporary storage function of RAM.

The control device 500 controls the engine 10, the first motor generator 52, and the second motor generator 54. That is, the control device 500 controls the power train of the vehicle. The control device 500 controls the engine 10, the first motor generator 52, and the second motor generator 54 so that the engine 10, the first motor generator 52, and the second motor generator 54 cooperatively generate an output torque required for the vehicle. The control device 500 receives a detection signal of a sensor provided in each unit of the vehicle.

The engine control unit 110 operates an operation unit of the engine 10 to control a torque, an exhaust component ratio, and the like, which are control amounts of the engine 10. The operating unit of the engine 10 is, for example, a throttle valve 14, a port injection valve 16R, 16L, an in-cylinder injection valve 22R, 22L, and a spark plug 24R, 24L.

Further, the motor control unit 130 operates the inverter 56 to control the rotation speed, which is the control amount of the first motor generator 52. In addition, the motor control unit 130 operates the inverter 58 to control torque, which is a control amount of the second motor generator 54.

FIG. 4 and FIG. 5 show MS6 from the respective operating-signal MS1 of the throttle valve 14, the port injection valve 16R, 16L, the in-cylinder injection valve 22R, 72L, the spark-plug 24R, 24L, and the inverters 56 and 58. The engine control unit 110 refers to the intake air amount Ga detected by the air flow meter 80 in order to control the control amount of the engine 10. The engine control unit 110 also refers to the output-signal Scr of the crank-angle sensor 82 and the water temperature TIM detected by the water temperature sensor 86. The engine control unit 110 also refers to the pressure PexR of the exhaust flowing into GPF 34R detected by the exhaust pressure sensor 88R. The engine control unit 110 also refers to the pressure PexL of the exhaust flowing into GPF 34L detected by the exhaust pressure sensor 88L. Further, the motor control unit 130 refers to the output-signal Sm1 of the first rotation angle sensor 90 that detects the rotation angle of the first motor generator 52 in order to control the control quantity of the first motor generator 52. The motor control unit 130 refers to the output-signal Sm2 of the second rotation angle sensor 92 that detects the rotation angle of the second motor generator 54 in order to control the control quantity of the second motor generator 54.

The engine control unit 110 and the motor control unit 130 are connected to the overall control unit 100 via communication lines. Each of the overall control unit 100, the motor control unit 130, and the engine control unit 110 exchanges and shares information based on a detection signal inputted from a sensor by CAN communication and calculated information with each other.

An accelerator position sensor 101, a brake sensor 102, and a vehicle speed sensor 103 are connected to the overall control unit 100. The accelerator position sensor 101 detects an accelerator operation amount. The brake sensor 102 detects an operation amount of a brake. The vehicle speed sensor 103 detects a vehicle speed that is a speed of the vehicle.

In addition, an air-fuel ratio sensor 81R, 811, is provided in the exhaust passage 30R, 30L. The air-fuel ratio sensor 81R, 81L is connected to the engine control unit 110. The air-fuel ratio sensor 81R, 81L detects the air-fuel ratio.

An upstream temperature sensor 87R for detecting the temperature of the exhaust gas between the three-way catalytic 32R and GPF 34R in the exhaust passage 30R is connected to the engine control unit 110. An upstream temperature sensor 87L for detecting the temperature of the exhaust gas between the three-way catalytic 32L and GPF 34L in the exhaust passage 30L is connected to the engine control unit 110. Also connected to the engine control unit 110 is a downstream temperature sensor 89R that detects the temperature of the exhaust gas downstream of GPF 34R. Also connected to the engine control unit 110 is a downstream temperature sensor 89L that detects the temperature of the exhaust gas downstream of GPF 34L.

The engine control unit 110 estimates the catalytic temperature and GPF temperature based on the engine load factor KL and the engine rotational speed NE, and the temperature of the exhaust gas detected by the upstream temperature sensor 87R, 87L and the downstream temperature sensor 89R, 89L. The catalyst temperature is the temperature of the three-way catalyst 32R, 32L. On the other hand, GPF temperature is the temperature of GPF 34R, 34L.

In addition, the engine control unit 110 calculates a counter CNT corresponding to the crank angle by counting the number of times the output-signal Scr of the crank angle sensor 82 is input. The value of the counter CNT corresponds to the crank angle, and the larger the value, the larger the crank angle. Then, when it becomes a value corresponding to 72.0 degrees, that is, 0 degrees, it is reset to "0" again. The crank angle of which the counter CNT is "0" is the crank angle at the compressive top dead center.

Fuel Injection Mode

The engine control unit 110 changes the fuel-injection mode of the engine in accordance with the engine load factor KL and the engine rotational speed NE. For example, in the high-load region, the engine 10 supplies the fuel only by the in-cylinder injection, which is the fuel injection by the in-cylinder injection valve 22R, 22L. In the low-load region, the engine 10 supplies the fuel only by the port injection, which is the fuel injection by the port injection valve 16R, 16L. In addition, the engine 10 may supply fuel by port injection and in-cylinder injection. In this case, the engine control unit 110 changes the ratio of the in-cylinder injection to the port injection in accordance with the engine load factor KL and the engine rotational speed NE. The engine 10 thus attempts to form an air-fuel mixture suitable for combustion.

The engine speed NE is calculated by the engine control unit 110 based on the output-signal Scr. The engine load factor is calculated by the engine control unit 110 based on the intake air volume Ga and the engine rotational speed NE.

Regeneration Processing

Figure 6:
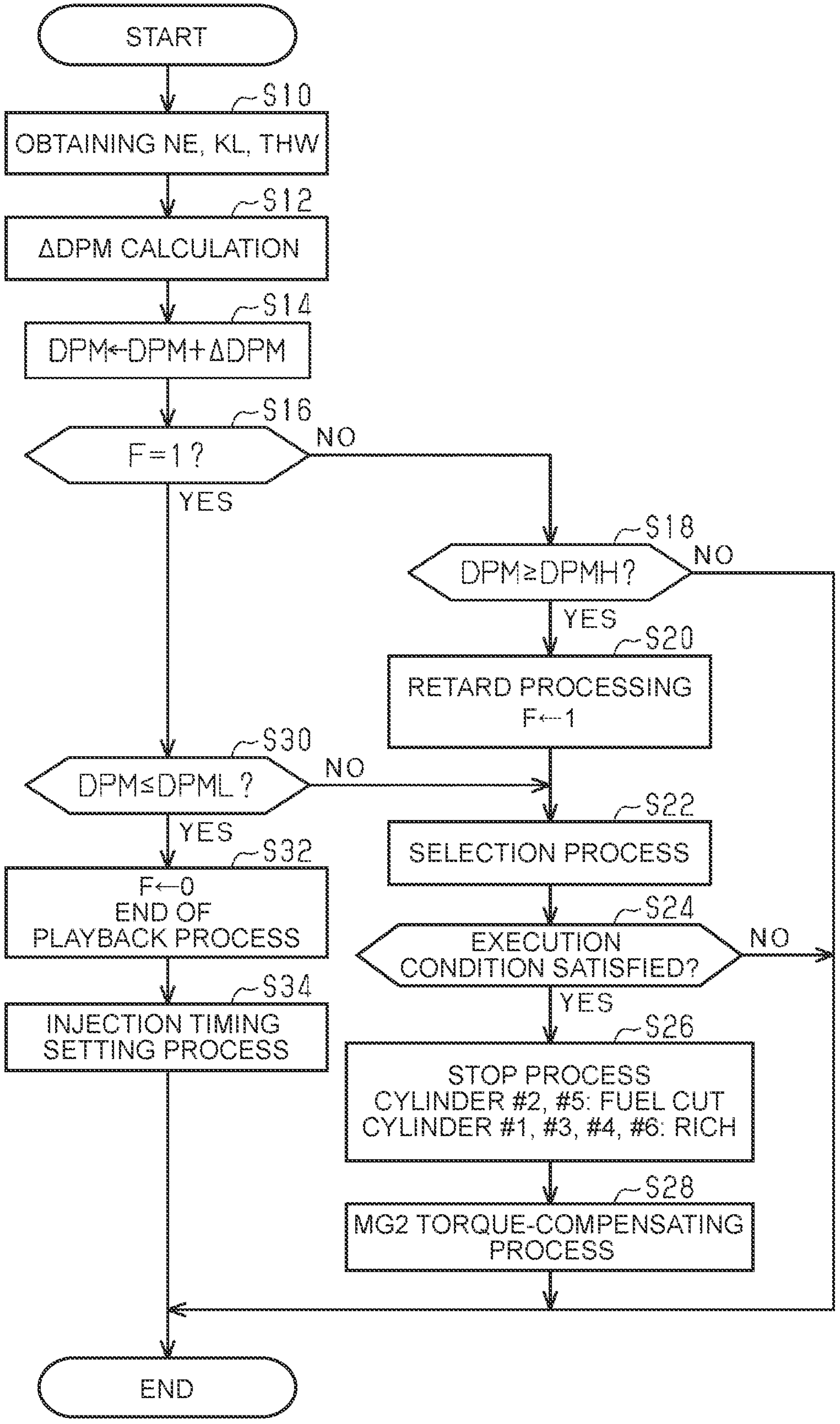
FIG. 6 is a flowchart illustrating a flow of a reproduction process.

FIG. 6 shows a processing procedure in a routine related to the reproduction processing executed by the engine control unit 110. In the following description, it is assumed that the port injection is performed in the engine 10 and the flag F is changed to 1 from a situation in which the flag F is 0, which will be described later. The routine illustrated in FIG. 6 is realized by the engine control unit 110 repeatedly executing a program stored in a memory at a predetermined cycle, for example. In the following, the step number of each process is represented by a number prefixed with "S".

In the routine illustrated in FIG. 6, the engine control unit 110 first acquires the engine speed NE, the engine load factor KL, and the water temperature THW (S10). Next, the engine control unit 110 calculates an updated amount ΔDPM of the accumulated amount DPM based on the engine rotational speed NE, the engine load factor KL, and the water temperature THW (S12). Here, the deposited amount DPM is the amount of PM collected in GPF 34R, 34L. Specifically, the engine control unit 110 calculates the quantity of PM in the exhaust gas discharged to the exhaust passage 30R, 30L based on the engine rotational speed NE, the engine load factor KL, and the water temperature THW. Then, the engine control unit 110 calculates the updated amount ΔDPM based on the amount of PM in the exhaust and GPF temperature.

The engine control unit 110 then S14 the deposition amount DPM by adding the update amount ΔDPM to the deposition amount DPM. Next, the engine control unit 110 determines, whether or not the flag F is "1" (S16). When the flag F is "1", it indicates that a regeneration process for burning out PM of GPF 34R, 34L is being performed. On the other hand, the flag F indicates that the reproduction process is not executed when the value is "0". When the engine control unit 110 determines that the flag F is "0" (S16: NO), it determines whether or not the accumulated volume DPM is equal to or greater than the reproduction execution-value DPMH (S18). The reproduction execution value DPMH is a threshold for determining that DPM of the accumulated amount is equal to or larger than the reproduction execution value DPMH and that PM needs to be removed.

Figures 7A, 7B, 7C:
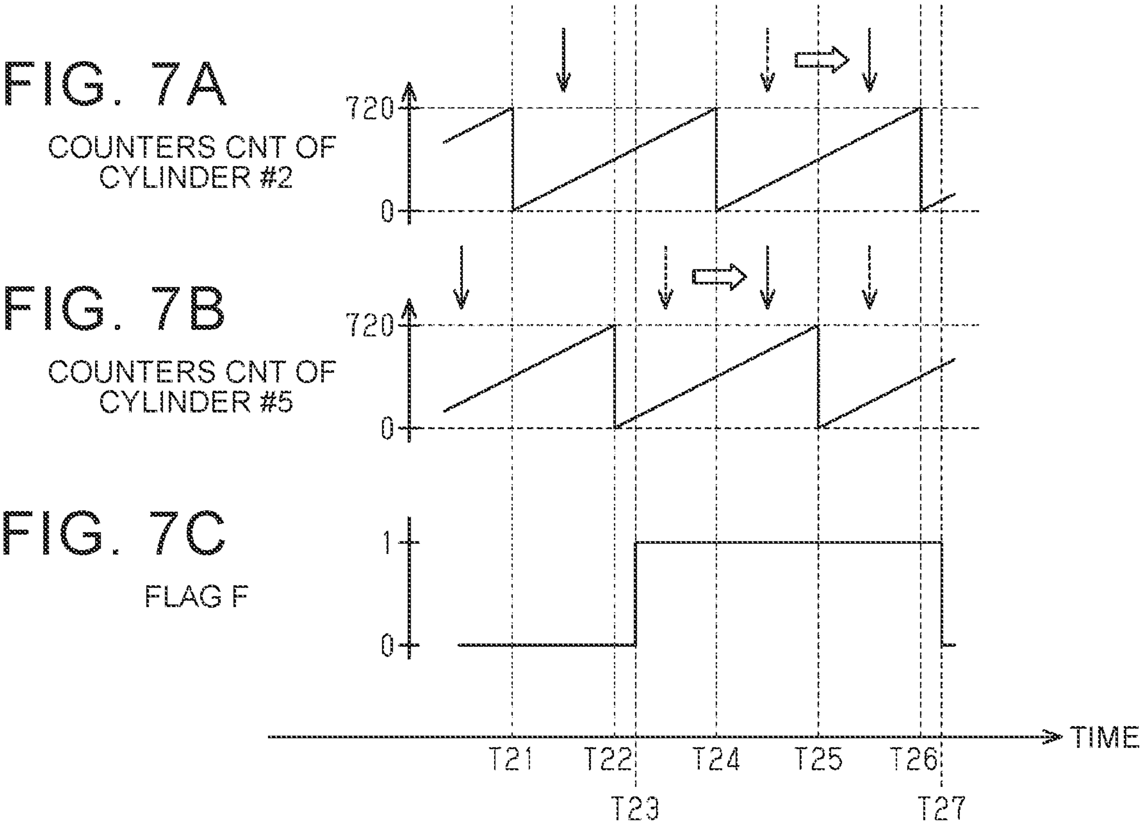
FIG. 7A is a timing chart showing the transition, showing the transition of the counter CN'f' of the cylinder #2.
FIG. 7B is a timing chart showing the transition, showing the transition of the counter CNT of the cylinder 45.
FIG. 7C is a timing chart showing the transition, showing the transition of the flag F.

When the engine control unit 110 determines that it is equal to or larger than the reproduction execution-value DPMH (S18: YES), the process proceeds to S20. In S20, the engine control unit 110 executes a retard process and assigns "1" to the flag F. The retard process is a process of retarding the fuel injection start timing so that the fuel injection start timing is included in the stoppable angle interval described later. The engine control unit 110 executes the retard process by changing the fuel injection modes of all the cylinders #1 to #6 from the port injection mode to the in-cylinder injection mode. The retardation processing will be described later with reference to FIG. 7. FIG. 7 shows switching from the mode in which the port injection is performed at the end of the expansion stroke (180 degrees) to the mode in which the in-cylinder injection is performed at the start of the compression stroke (540 degrees). Delay angle processing means such switching.

The engine control unit 110 executes S20 retardation process, and then proceeds to S22. The engine control unit 110 executes a selection process in S22. The selection process is a process of selecting one cylinder that is a target of a stop instruction for stopping the fuel supply from among the stop target cylinders each time the compression top dead center appears in any one of the cylinder #2 and the cylinder #5 that is the stop target cylinder. The selection process is a process of selecting a cylinder whose compression top dead center appears earliest among the cylinder #2 and the cylinder #5 which are the stop target cylinders at the time of execution of the selection process. In the present embodiment, the arrival timing of the compression top dead center in one of the stop target cylinders is separated by 360 degrees at the crank angle from the arrival timing of the compression top dead center in the other of the stop target cylinders. For this reason, the selection process is a process of alternately selecting one cylinder, which is a target of a stop instruction for stopping the fuel supply, among the cylinders to be stopped at a crank angle of 360 degrees every minute. As illustrated in FIG. 6, the engine control unit 110 executes a selection process before a stop process described later.

After executing S22 selection process, the engine control unit 110 proceeds to S24. In S24, the engine control unit 110 determines whether or not the condition for executing the regeneration process is satisfied. Here, the execution condition may be a condition that the logical product of the following condition (A) to condition (D) is true.

Condition (A): Condition indicating that the engine torque command value Te*, which is a torque command value for the engine 10, is equal to or greater than the predetermined value Teth.

Condition (B): Condition that the engine rotational speed NE is equal to or higher than the predetermined speed.

Condition (C): Condition that MG2 tongue-compensating process of S28 can be executed.

Condition (D): Condition indicating that the current time point is earlier than the fuel injection start time in the combustion cycle of the selected cylinder to be the stop instruction target between the cylinder #2 and the cylinder #5.

Condition (D) will now be described. Each of the plurality of cylinders #1 to #6 repeatedly executes the combustion cycle so that the compression top dead center appears sequentially in the plurality of cylinders #1 to #6. Here, the operation from the start of the expansion stroke to the end of the compression stroke is a combustion cycle. The crank angle interval from when the cylinder to be the stop instruction target is selected until the cylinder to be the stop instruction target is switched to the next cylinder among the stop target cylinders is the stoppable angle interval. The stop instruction for the selected cylinder is received before the fuel injection start time and at the stoppable angular interval during the combustion cycle. Condition (D) is a condition related to whether or not such a requirement is satisfied.

If the engine control unit 110 determines that the logical product is true (S24: YES), it proceeds to S26. The engine control unit 110 executes a stopping process in S26. The engine control unit 110 issues a stop instruction to the selected cylinder that is the target of the stop instruction. Then, the engine control unit 110 sets the air-fuel ratio of the air-fuel mixture in the cylinders #1, #3, #4, and #6 to be richer than the stoichiometric air-fuel ratio. That is, the regeneration process includes a stop process of stopping the supply of fuel to the cylinders #2 and #5, which are the stop target cylinders, and supplying the fuel to the remaining cylinders #1, #3, #4, and #6. This process is a process for burning and removing PM collected by GPF 34R, 34L by raising GPF 34R, 34L by discharging oxygen and unburned fuel to the exhaust passage 30R, 30L. That is, the engine control unit 110 discharges oxygen and the unburned fuel to the exhaust passage 30R, 30L, thereby burning the unburned fuel in the three-way catalytic 32R, 32L or the like and raising the temperature of the exhaust gas. Thus, GPF 34R, 34L can be heated. Further, by supplying oxygen to GPF 34R, 34L, PM collected by GPF 34R, 34L can be burned and removed.

The engine control unit 110 requests the motor control unit 130 to perform a process of compensating for the torque variation of the crankshaft 26 of the engine 10 caused by the stoppage of the combustion control of the cylinder #2 or the cylinder #5 (S28). Upon receiving the request, the motor control unit 130 superimposes the compensation torque on the required torque for traveling with respect to the second motor generator 54. The motor control unit 130 operates the inverter 58 based on the required torque on which the compensation torque is superimposed. As described above, the control device 500 executes the stop process and the compensation process of compensating the decrease in the output torque of the engine 10 caused by the stop process through the second motor generator 54.

MG2 torque compensating process (C) can be executed by the second motor generator 54 having no abnormality, the battery storing electric power required to execute MG2 torque compensating process, and the like. The condition (C) may further include that a time required for communication between the engine control unit 110 and the motor control unit 130 is secured. The condition (C) may be set in consideration of a control delay caused by a control cycle of the motor control unit 130.

On the other hand, when the engine control unit 110 determines that the flag F is "1" (S16: YES), the process proceeds to S30. In S30, the engine control unit 110 determines whether or not the deposit DPM is equal to or less than the stopping-threshold DPML. The stopping threshold value DPML is a threshold value for determining that the regeneration process may be stopped based on the fact that the deposit quantity DPM is equal to or smaller than the stopping threshold value DPML. The stopping-threshold DPML is smaller than the reproduction-execution-value DPMH. The engine control unit 110 proceeds to S32 when the deposit DPM is equal to or less than the stopping-threshold DPML (S30: YES). In S32, the engine control unit 110 ends the regeneration process and assigns "0" to the flag F. The engine control unit 110 then proceeds to S34. The engine control unit 110 performs an injection timing setting process in S34. The injection timing setting process is a process of optimizing the fuel injection start timing when the fuel injection start timing set by S20 is not optimal for burning. For example, the fuel injection start timing is advanced.

The engine control unit 110 proceeds to S22 if the deposit. DPM is greater than the stopping thresholds DPML (S30: NO). The engine control unit 110 performs a process after S22 and S22 as described above.

When S28, S34 process is completed or when a negative determination is made in S18 S24 process, the engine-control unit 110 temporarily ends the routine illustrated in FIG. 6.

Operation of this Embodiment

The operation of the present embodiment will be described with reference to FIG. 7.

As described above, the regeneration process includes a stop process of stopping the supply of fuel to the cylinders #2 and #5, which are the stop target cylinders, and supplying the fuel to the remaining cylinders #1, #3, #4, and #6. Cylinders #2 and #5 are referred to as opposed cylinders. The arrival timing of the compression top dead center in one of the opposed cylinders is separated by 360 degrees at the crank angle from the arrival timing of the compression top dead center in the other of the opposed cylinders. As described above, combustion is performed in the six cylinders #1 to #6 in this order.

As described above with respect to S22 selection process, the engine control unit 110 can only issue an instruction for stopping the supply of the fuel to the cylinder #2 and the cylinder #5 which have the compressed top dead center appearing in advance as viewed from the present point of time. From the time T21 to the time T22 in FIG. 7, from the time T24 to the time T25, the engine control unit 110 can only issue an instruction for stopping the supply of the fuel to the cylinder #5. The crank angle interval corresponding to the period from the time T21 to the time T22 is a stoppable angle interval related to the cylinder #5. Similarly, the crank angle interval corresponding to the period from the time T24 to the time T25 is the stoppable angle interval for the cylinder #5. Fro the time T22 to the time T24 and from the time T25 to the time T26, the engine control unit 110 can only issue an instruction to stop supplying fuel to the cylinder #2. The crank angle interval corresponding to the period from the time T22 to the time T24 is a stoppable angle interval related to the cylinder #2. Similarly, the crank angle interval corresponding to the period from the time T25 to the time T26 is the stoppable angle interval for the cylinder #2. As described above, the stoppable angle interval is an interval from the timing 360 degrees before the arrival timing of the compression top dead center at the crank angle to the arrival timing of the compression top dead center.

Here, it is assumed that the stopping process is to be started from a situation in which the port injection is performed at a crank angle 540 degrees before the crank angle corresponding to the compression top dead center in each of the cylinders #1 to #6. The port injection may occur through the port injection valve 16R, 16L. In FIG. 7, a downward arrow indicates a fuel injection start timing.

When the engine control unit 110 of the engine 10 tries to stop the fuel supply to the cylinders #2 and #5, the stop process can be performed by performing the retard process as described below.

Between the time T21 and the time T23, the flag F is 0. Therefore, between the time T21 and the time 123, the engine control unit 110 repeats the processes of S10, S12, S14, S16 and S18 in FIG. 6 in this order. That is, S26 stopping process is not executed between the time T21 and the time T23.

In the time T23, the flag is switched from "0" to "1". Specifically, the engine control unit 110 executes the retard process in S20 of FIG. 6 and assigns "1" to the flag F. The retard process is a process of retarding the fuel injection start timing as indicated by a white arrow in FIG. 7. With respect to the cylinder #5, the fuel injection start timing before the retard angle between the time T22 and the time T25 is indicated by a broken line, and the fuel injection start timing after the retard angle between the time T22 and the time T25 is indicated by a solid line. With respect to the cylinder #2, the fuel injection start timing before the retard angle between the time T24 and the time T26 is indicated by a broken line, and the fuel injection start timing after the retard angle between the time T24 and the time T26 is indicated by a solid line. With respect to the cylinder #5, the timing of starting the fuel-injection after the retard angle is within a period from the time T24 to the time T125. With respect to the cylinder #2, the timing of starting the fuel-injection after the retard angle is within a period from the time T25 to the time T26. As described above, the retard process is a process of retarding the fuel injection start timing so that the stoppable angle interval includes the fuel injection start timing.

In this way, there is a section before the fuel injection start time in the stoppable angular interval. Specifically, the above-described condition (D) is satisfied from the time T24 to the time when the cylinder #5 starts to be injected. In addition, the condition (D) is satisfied from the time T25 to the time when the cylinder #2 starts to be injected. Therefore, the engine control unit 110 can execute S26 stopping process when all the conditions (A) to (C) are satisfied.

In the time T27, the flag F is switched from "1" to "0". Specifically, in S32 of FIG. 6, the engine control unit 110 ends the reproduction process and assigns "0" to the flag F.

Effect of this Embodiment (1) During the combustion cycle, if the fuel injection start timing is before the stoppable angular interval, no stop instruction is accepted. According to the above-described embodiment, the control device 500 executes the retard process of retarding the fuel injection start timing so that the stoppable angle interval includes the fuel injection start timing. Therefore, in the stoppable angular interval, there is a section before the fuel injection start timing. A stop instruction is received in the section. When the stop instruction is received in the section, the fuel supply can be stopped in the section. That is, during the combustion cycle, the fuel supply can be stopped by performing the retard process on a configuration in which the fuel supply cannot be stopped due to the arrival of the fuel injection start timing before the stoppable angle interval.

(2) The port injection must be performed before the start of the compression stroke. In contrast, the in-cylinder injection can be performed after the start of the compression stroke. According to the above-described embodiment, the control device 500 can execute the retard process by changing the fuel injection mode from the port injection mode to the in-cylinder injection mode. Therefore, the injection start timing of the port injection can be significantly retarded as compared with a configuration in which the injection start timing of the port injection is retarded while maintaining the port injection mode. Therefore, the section in which the stop instruction is accepted can be increased.

(3) According to the above embodiment, the second motor generator 54 compensates for a decrease in the output torque of the engine 10 caused by the stop process. Therefore, fluctuations in the output torque of the vehicle can be suppressed.

(4) According to the above-described embodiment, by performing the retard process in the engine 10 having six cylinders, it is possible to stop the supply of fuel to the cylinders #2 and #5, which are two opposed cylinders.

Example of Change

The present embodiment can be modified and implemented as follows. The present embodiment and modification examples described below may be carried out in combination of each other within a technically consistent range.

In the above embodiment, the case where the cylinders #2 and #5 are to be stopped has been described. For example, when the regeneration process is ended in S32, the cylinders #3 and #6 may be determined as the stopping target cylinders in the next regeneration process. That is, the two cylinders to be stopped may be switched to the other two cylinders to be stopped at an appropriate timing.

In the above-described embodiment, in the retarding process of S20, the fuel-injection mode of all the cylinders #1 to #6 is changed from the port-injection mode to the in-cylinder injection mode. However, this is only an example. In S20 retardation process, the engine control unit 110 may change only the fuel-injection modes of the cylinders #2 and #5, which are the stop-target cylinders, to the in-cylinder injection. That is, the engine control unit 110 may execute the retard process by changing the fuel injection mode in the cylinder to be stopped from the port injection mode to the in-cylinder injection mode.

In the above-described embodiment, the stop process is a process of stopping the supply of fuel to the cylinders #2 and #5, which are to be stopped, and supplying fuel to the remaining cylinders #1, #3, #4, and #6. However, this is only an example. The stop process may be a process of stopping the supply of fuel to the cylinder to be stopped, which is two or more cylinders out of the plurality of cylinders #1 to #6, and supplying fuel to the remaining one or more cylinders.

In the above-described embodiment, the engine control unit 110 executes the retard process by changing the fuel injection mode in the cylinder to be stopped from the port injection mode to the in-cylinder injection mode. The engine control unit 110 may execute the retard process by retarding the injection start timing of the port injection in the stop target cylinder while maintaining the fuel injection mode in the stop target cylinder in the port injection mode. In a configuration in which the engine 10 includes the port injection valve 16R, 16L and the in-cylinder injection valve 22R, 22L, it is possible to generate a section in which a stopping instruction is accepted even if the port injection mode is maintained. The injection start timing in the cylinders #1, #3, #4, and #6 other than the stop target cylinder may or may not be retarded.

In the above-described embodiment, the engine 10 includes the port-injection valve 16R, 16L and the in-cylinder injection valve 22R, 22L. However, this is only an example. For example, the engine 10 may include a port-injection valve 16R, 16L, but may not include an in-cylinder injection valve 22R, 22L. The engine control unit 110 may execute the retard process by retarding the injection start timing of the port injection in the stop target cylinder while maintaining the fuel injection mode in the stop target cylinder in the port injection mode. Thus, a section in which the stop instruction is accepted can be generated.

The execution conditions of the reproduction process are not limited to those exemplified in the above-described embodiment. For example, with respect to the three conditions from the condition (A) to the condition (C), only two of them may be included in the execution condition, and only one of them may be included in the execution condition. Conditions (A) to (C) may be omitted. The condition (D) may be a condition indicating that the current time point is a predetermined time before the fuel injection start time point in the combustion cycle of the selected cylinder that is the target of the stop instruction. The predetermined time may be set, for example, in consideration of a communication delay related to the stop instruction.

The purpose of executing the stopping process for supplying oxygen is not limited to the regeneration process. For example, the retard process as in the above-described embodiment may be executed in the engine 10 that executes the stopping process for warming up the three-way catalytic 32R, 32L.

The process of estimating the deposit DPM is not limited to the process illustrated in FIG. 6. For example, the accumulated amount DPM may be estimated based on the difference in pressure between the upstream side and the downstream side of GPF 34R, 34L and the intake air amount Ga. Specifically, the deposition amount DPM may be estimated to be larger than that in the case where the difference in pressure is large, and even if the difference in pressure is the same, the deposition amount DPM may be estimated to be larger than that in the case where the difference in intake air amount Ga is small. Here, when the pressure downstream of GPF 34R, 34L is regarded as a constant value, the pressure PexR, PexL may be used instead of the differential pressure.

The layout of the three-way catalyst 32R, 32L in the exhaust passage 30R, 30L and the layout of GPF 34R, 34L may be a layout in which GPF 34R, 34L is provided upstream of the three-way catalyst 32R, 32L.

GPF 34R, 34L is not limited to a filter on which a three-way catalytic converter is supported, and may be only a filter. Further. GPF 34R, 34L is not limited to the one provided downstream of the three-way catalytic 32R, 32L in the exhaust-passage 30R, 30L. In addition, it is not essential to include GPF 34R, 34L. For example, even when the post-treatment device is composed only of the three-way catalyst 32R, 32L, as described above, a shutdown process may be performed to warm up the three-way catalyst 32R, 32L.

MG2 torque-compensating process of S28 may be omitted.

The process of stopping S26 may not include enrichment of the air-fuel ratio in the cylinders other than the cylinder to be stopped. For example, in GPF 34R, 34L regeneration process, if GPF temperature is sufficiently high and oxygen is supplied, if the combustion of the particulate matter is generated, the regeneration can be continued and proceeded without enrichment in the stopping process.

In the above-described embodiment, the control device 500 includes a CRU, a ROM, and a RAM, and executes a software-process. However, this is only an example. For example, the control device 500 may include dedicated hardware circuitry (e.g., ASIC, etc.) that processes at least a part of the software processes executed in the above-described embodiment. That is, the control device 500 may have any of the following configurations (a) to (c). (a) The control device 500 includes a processing device that executes all processes in accordance with a program, and a program storage device such as a ROM that stores a program. That is, the control device 500 includes a software execution device. (b) The control device 500 includes a processing device that executes a part of processing according to a program, and a program storage device. Furthermore, the control device 500 includes dedicated hardware circuits for executing the remaining processing. (c) The control device 500 includes a dedicated hardware circuit for executing all processes. Here, a plurality of software execution devices and/or dedicated hardware circuits may be provided. That is, the processing may be performed by a processing circuit including at least one of a software execution device and a dedicated hardware circuit. The processing circuit may include a plurality of software execution devices and dedicated hardware circuits. Program storage or computer readable media includes any available media that can be accessed by a general purpose or special purpose computer.

In the above-described embodiment, the engine 10 includes six cylinders #1 to #6. However, this is only an example. The number of cylinders included in the engine can be changed as appropriate. For example, the engine 10 may have eight cylinders. The e 10 may be a series engine, a horizontally opposed engine, or a W-type engine.

In the above embodiment, the vehicle includes a first motor generator 52 and a second motor generator 54. However, this is only an example. For example, the vehicle may include only one motor generator.

The vehicles are not limited to series/parallel hybrid electric vehicle, and may be, for example, parallel hybrid electric vehicle or series hybrid electric vehicle. However, it is not limited to hybrid electric vehicle, for example, the power generating device of the vehicle may be a vehicle of only the engine 10.

What is claimed is:

1. A control device of a vehicle including an internal combustion engine having a plurality of cylinders, the control device comprising a processing circuit, wherein the processing circuit is configured such that:

the processing circuit executes a stop process of stopping a fuel supply to two or more cylinders of the plurality of cylinders and supplying fuel to a remaining one or more cylinders;

each of the plurality of cylinders repeatedly executes a combustion cycle such that a compression top dead center of the plurality of cylinders sequentially appears, an operation from a start of an expansion stroke to an end of a compression stroke being the combustion cycle; and the processing circuit executes a selection process before the stop process, one cylinder that is a target of a stop instruction for stopping the fuel supply among stop target cylinders being selected in the selection process, every time the compression top dead center appears in any stop target cylinder in which the fuel supply is stopped;

the selection process is a process of selecting a cylinder in which a compression top dead center appears earliest among the stop target cylinders at the time of execution of the selection process, a crank angle interval from when the cylinder to be subjected to the stop instruction is selected to when the cylinder to be subjected to the stop instruction is switched to the next cylinder among the stop target cylinders is a stoppable angle interval, and the stop instruction for the selected cylinder is received during the combustion cycle and before a fuel injection start timing and during the stoppable angle interval; and the processing circuit executes a lag process in which the fuel injection start timing for the selected stop target cylinder is retarded relative to the compression top dead center of the selected stop target cylinder such that the stoppable angle interval includes the fuel injection start timing.

2. The control device according to claim 1, wherein the internal combustion engine includes a plurality of intake ports connected to each of the plurality of cylinders, a plurality of port injection valves provided in each of the plurality of intake ports, and a plurality of in-cylinder injection valves provided in each of the plurality of cylinders, wherein each of the plurality of port injection valves is configured to execute a port injection of injecting fuel into a corresponding intake port of the plurality of intake ports, wherein each of the plurality of in-cylinder injection valves is configured to execute an in-cylinder injection of injecting fuel into a corresponding cylinder of the plurality of cylinders, and wherein the processing circuit is configured to execute the lag process by changing a fuel injection mode in the selected stop target cylinder from a port injection mode to an in-cylinder injection mode.

3. The control device according to claim 1, wherein the internal combustion engine includes a plurality of intake ports connected to each of the plurality of cylinders, and a plurality of port injection valves provided in each of the plurality of intake ports, wherein each of the plurality of port injection valves is configured to perform a port injection of injecting fuel into a corresponding intake port of the plurality of intake ports, and wherein the processing circuit is configured to execute the lag process by making retarding an injection start timing of the port injection in the selected stop target cylinder relative to the compression top dead center of the selected stop target cylinder.

4. The control device according to claim 1, wherein the vehicle includes a motor generator, wherein the processing circuit is configured to control the internal combustion engine and the motor generator such that the internal combustion engine and the motor generator cooperate to generate an output torque required for the vehicle, and wherein the processing circuit is configured to execute together with the stop process, a compensation process for compensating, through the motor generator, a decrease in an output torque of the internal combustion engine caused by the stop process.

5. The control device according to claim 1, wherein the number of the plurality of cylinders is six, wherein the stop process is a process of stopping the fuel supply to each of two cylinders of the plurality of cylinders, wherein the two cylinders are the stop target cylinders, and supplying fuel to the remaining four cylinders, wherein an arrival timing of the compression top dead center in one of the two stop target cylinders is separated by 360 degrees of a crank angle from an arrival timing of a compression top dead center in the other one of the stop target cylinders, wherein the selection process is a process of alternately selecting one cylinder to be a target for a stop instruction for stopping the fuel supply among the stop target cylinders, every 360 degrees of the crank angle, and wherein the lag process is a process of making retarding the fuel injection start timing relative to the compression top dead center of the selected stop target cylinder such that the fuel injection start timing is included in the stoppable angle interval.

* * * * *